United States Patent
Korgaonkar et al.

(10) Patent No.: US 7,302,539 B2
(45) Date of Patent: Nov. 27, 2007

(54) MIGRATING DATA IN A STORAGE SYSTEM

(75) Inventors: Anuja Korgaonkar, Colorado Springs, CO (US); Jesse Yandell, Colorado Springs, CO (US); Brian L. Hoffman, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 301 days.

(21) Appl. No.: 11/111,090

(22) Filed: Apr. 20, 2005

(65) Prior Publication Data

US 2006/0242379 A1 Oct. 26, 2006

(51) Int. Cl.
*G06F 12/16* (2006.01)

(52) U.S. Cl. .................. 711/162; 711/161; 711/112; 711/170; 714/6; 714/5

(58) Field of Classification Search .................. 711/114
See application file for complete search history.

(56) References Cited

U.S. PATENT DOCUMENTS

| | | | |
|---|---|---|---|
| 6,298,425 B1 | 10/2001 | Whitaker et al. | |
| 6,553,511 B1 | 4/2003 | DeKoning et al. | |
| 6,606,629 B1 | 8/2003 | DeKoning et al. | |
| 6,665,815 B1 | 12/2003 | Goldstein et al. | |
| 6,801,921 B2 | 10/2004 | Tsuchida et al. | |
| 6,829,623 B2 | 12/2004 | Tsuchida et al. | |
| 6,880,059 B2 * | 4/2005 | Mizuno et al. | 711/170 |
| 2003/0079083 A1 | 4/2003 | Lubbers et al. | |
| 2003/0079102 A1 | 4/2003 | Lubbers et al. | |
| 2003/0084241 A1 | 5/2003 | Lubbers et al. | |

* cited by examiner

*Primary Examiner*—B. James Peikari

(57) ABSTRACT

A method of managing storage comprises connecting a number of virtual disks to a disk controller loop of a disk controller, and mounting a portion of the number of virtual disks to the disk controller wherein a storage map is loaded into a fixed-size memory of the disk controller for each virtual disk mounted. The method further comprises receiving a request for data contained on an unmounted virtual disk with the unmounted virtual disk having a storage map of certain size. A sufficient number of mounted virtual disks are dismounted to allow the fixed-size memory to accommodate the certain size of the unmounted virtual disk storage map. The unmounted virtual disk may be mounted.

20 Claims, 7 Drawing Sheets

MIGRATING DATA IN A STORAGE SYSTEM

BACKGROUND

Life cycle data management may be implemented to increase or maximize the value of previously acquired data and ongoing data collection. Various life cycle data management schemes impose documented decision paths for regulatory review and legal protection. Life cycle data management imposes severe demands for data archival that become increasingly difficult as data set sizes grow. While tape backup is possible but increasingly costly for restoration within an overnight time window, faster response is demanded in many situations and conditions.

As the size of disk drives increases and the demand for large data sets grows, a virtualizing disk controller can become a performance and availability bottleneck. Large pools of physical disk storage are served to growing clusters of client hosts through single or dual disk controllers. The controllers have a bandwidth limited by a maximum of several Peripheral Component Interface eXpress (PCI-X) buses. Furthermore, the controller's mean time before failure (MTBF) performance is lagging data availability imposed by the upward scaling of data set size and client workload.

Several techniques have been used to address mapping limitations on physical disk space for virtualizing controllers. For example, increasing virtualization grain size has been attempted to allow more physical disk space to be mapped without increasing the amount of random access memory, a technique that suffers from poor performance of snapshots on random write workloads.

Adding more ports to disk controllers increases bandwidth, but the industry is now at the limit of fan-out for a multiple-drop bus such as PCI-X. Therefore, the addition of more ports often is attained at the expense of a slowed clock-rate, limiting the potential increase in bandwidth.

Disk controllers have contained the metadata for Redundant Array of Independent Disks (RAID) and virtualization constructs, thereby coupling the disk controllers to the data served by the controllers. Accordingly, disk replacement becomes complicated and data migration prevented.

Dual controller arrangements are commonly used to address mean time before failure (MTBF) and data availability limitations. Dual controller arrangements are typically tightly-coupled pairs with mirrored write-back caches. Extending beyond a pair becomes an intractable control problem for managing the mirrored cache. Pairing the controllers roughly squares the hardware MTBF at the expense of common-mode software problems that become significant in a tightly-coupled controller architecture.

SUMMARY

In accordance with an embodiment of a storage system, a method of managing storage comprises connecting a number of virtual disks to a disk controller loop of a disk controller, and mounting a portion of the number of virtual disks to the disk controller wherein a storage map is loaded into a fixed-size memory of the disk controller for each virtual disk mounted. The method further comprises receiving a request for data contained on an unmounted virtual disk with the unmounted virtual disk having a storage map of certain size. A sufficient number of mounted virtual disks are dismounted to allow the fixed-size memory to accommodate the certain size of the unmounted virtual disk storage map. The unmounted virtual disk may be mounted.

BRIEF DESCRIPTION OF THE DRAWINGS

Embodiments of the invention relating to both structure and method of operation may best be understood by referring to the following description and accompanying drawings.

DETAILED DESCRIPTION

Virtualizing disk controllers are inherently limited in the amount of physical disk space that can be mapped, a limit imposed by the amount of relatively costly random access memory (RAM) used to make virtualization map look-ups operate with high performance. These limitations can be overcome since not all storage needs to be mapped at all times. Lesser-used data sets can be migrated to a near-line or off-line state with virtualization maps off-loaded from RAM.

Sets of disk drives can be written with metadata to form a self-identifying virtualization group. The set of disks can be placed off-line, transported, migrated, or archived. The disk set can be later reloaded on the same or different virtualizing controller and brought online.

In some implementations, multiple virtualizing controllers can share the set of disks in a network and form a storage cluster or grid architecture.

Figure 1:
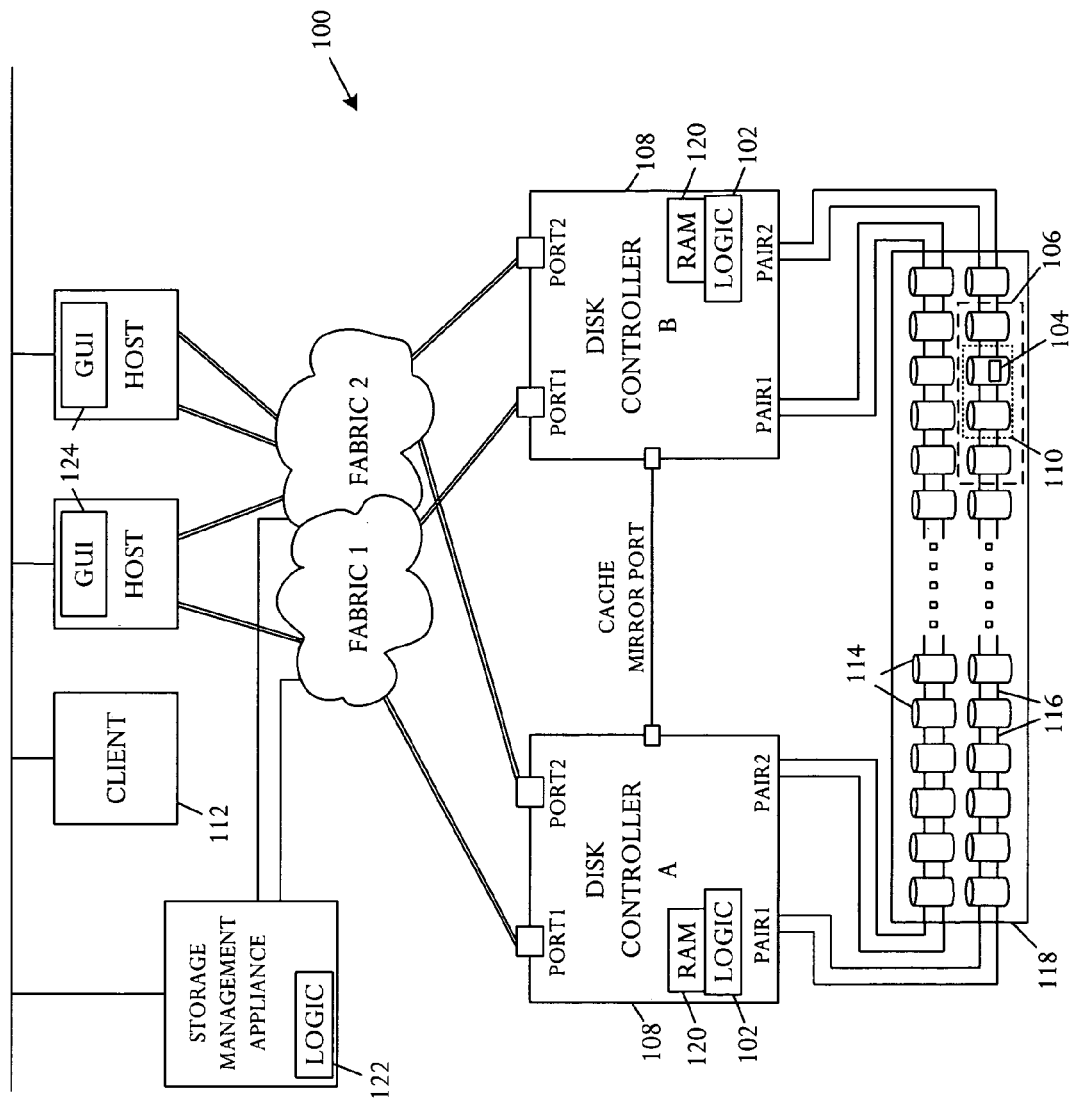
FIG. 1 is a schematic block diagram depicting an embodiment of a storage apparatus configured to access virtually unlimited storage.

Referring to FIG. 1, a schematic block diagram depicts an embodiment of a storage apparatus 100 configured to access virtually unlimited storage. The storage apparatus 100 comprises a logic 102 adapted to write, to disk group metadata 104, information including state information that self-identifies state of a disk group 106 and enables a disk controller 108 to load and present virtual disks 110 corresponding to the disk group 106 as logical units to a client 112 in the absence of disk group state information contained in the disk controller 108. Presentation of a virtual disk to a client or host means that the virtual disk becomes available to the client or host.

In an illustrative embodiment, the storage apparatus 100 further comprises a disk controller 108. The logic 102 is executable in the disk controller 108. The logic 102 may be implemented as any suitable executable component such as a processor, a central processing unit (CPU), a digital signal processor, a computer, a state machine, a programmable logic array, and the like. In other embodiments, logic may be implemented in other devices such as a host computer, a workstation, a storage controller, a network appliance, and others. The logic may be considered to be software or firmware that executes on hardware elements or may be the operating processing elements or circuitry.

A virtual disk 110 is a virtualized disk drive created by disk controllers 108 as storage for one or more hosts. Virtual disk characteristics designate a specific combination of capacity, availability, performance, and accessibility. A controller pair manages virtual disk characteristics within the disk group 106 specified for the virtual disk 110. By definition, a host sees the virtual disk 110 exactly in the manner of a physical disk with the same characteristics.

In some embodiments, the storage apparatus 100 may be in the form of a storage system. In preparation for creating self-identifying virtualization groups, the logic 102 may include processes that divide a plurality of disks 114 into disk group subsets 106. Individual disk groups form a self-contained domain from which virtualized disks are allocated.

A disk group is the set of physical disk drives in which a virtual disk is created. The physical disk is a disk drive that plugs into a drive bay and communicates with the controllers through an interface such as device-side Fibre Channel loops. The controllers alone communicate directly with the physical disks. The physical disks in combination are called an array and constitute a storage pool from which the controllers create virtual disks. In a particular example embodiment, one controller pair can support up to 240 physical disks. A particular disk drive can belong to only one disk group. Multiple virtual disks can be created in one disk group. A single virtual disk exists entirely within one disk group. A disk group can contain all the physical disk drives in a controller pair's array or may contain a subset of the array.

The logic 102 is configured to execute several actions. The logic 102 can create a disk group by combining one or more physical disk drives into one disk group. A typical system automatically selects drives based on physical location. The logic 102 may also modify a disk group by changing disk group properties including the disk failure protection level, occupancy alarm level, disk group name, or comments. The logic 102 may add a new physical disk to a disk group or may delete a disk group by freeing all physical drives contained in that disk group. The logic 102 can ungroup a disk by removing a disk from a disk group.

The logic 102 implements functionality that writes information to the disk group metadata 104 describing virtual disk content and mapping. In a particular implementation, metadata 104 may be written in the disk group 106 that self-describes the virtual disk content and mapping. The logic 102 may write state information in mirrored protected areas of the disks so that the disk controller 108 can load and present virtual disks 110 as logical units (luns) without the disk controller 108 containing any state data for the disk group 106. The disk group metadata 104 creates the self-describing functionality of the disk group 106. The information may include tags describing the state progression of the disk group 106 among various on-line, near-line, and off-line states.

The metadata is made self-describing by writing sufficient metadata within a disk group to enable complete reconstruction of the disk group even with no additional information. Accordingly, the disk group should be capable of reconstruction in a different system with a different controller, even at an indeterminate time in the future.

The logic 102 may be configured to selectively tag individual disks so that the disks can be optionally installed into any of multiple slots 116 in one or more storage arrays 118. The tags are formed to describe disk properties sufficiently to reconstruct disk group mapping regardless of disk installation position and regardless of the storage system to which the disks are returned from archive, migration, or transport.

The illustrative virtualization operation enables data, including metadata, to be accessible generally regardless of position or order. A small amount of bootstrap information is included at the beginning of a disk that originates the process of loading the maps. The bootstrap information describes the position of remaining data and enables recreation of the entire data set and all metadata. The logic 102 writes sufficient data to the disks to enable the disks to be taken off-line, transported, migrated, and archived, and then returned to the originating slot or to any slot in any system whereby the maps are recreated upon disk reinstallation.

The illustrative virtualization operation enables an entire virtualization subset of storage to be paged out for archival purposes or in conditions that the amount of local disk controller memory is insufficient to hold the mapping. To conserve local memory, all virtualization maps are not loaded into memory at once. Instead only information that is currently active is mapped, including currently accessed data and current data snapshots. Dormant data that is not currently accessed, for example including backup data, may be maintained in warm standby, for example in a cabinet, or in cold standby such as in a vault.

To execute the virtualization operation attaining virtually unlimited storage, the logic 102 specifies the state of a disk group within the metadata which is written to disk. In some embodiments, the state may be as simply identified as off-line or online. An illustrative embodiment may define several states including online, near-line or warm standby, cool state with the disk drive spun down, and off-line.

The logic 102 also executes a tracking operation during manipulation of the disk group. Tracked information includes, for example: (1) an indication of whether the disk group is currently mapped in random access memory or mapped on the disk, (2) if the disk group is currently mapped in memory, an indication of whether the memory has been updated, (3) an indication of whether caches are to be flushed before the disk group is placed in the off-line state, and other possible information.

The logic 102 may also execute a realizing operation that transfers all the metadata for a disk group from disk and arranges the metadata in random access memory. The realizing operation promotes efficiency, and thus performance, by avoiding inefficient or unnecessary disk read operations such as a read of a data item simply to determine the location of another data item. During the realizing operation, the metadata can be updated, modified, or moved. For example, realizing may include balancing or leveling the amount of data on a particular disk. Portions of data may be selectively deleted. Data may be restored back to the free pool.

Data manipulations may be performed in the random access memory. When a particular disk group is taken off-line and the metadata is removed from memory for replacement by metadata from a replacing disk group, the updated metadata is flushed back onto disk. A user may possibly spin disks down for removal off-line. Therefore, the logic 102 performs the manipulations to metadata intelligently, for example maintaining a cached copy of the metadata in RAM during usage and flushing the updated metadata back to disk before the disk is spun down or removed from the system.

The logic 102 is adapted to manage state progression tags in the metadata. The progression tags indicate the state of the disk group, for example the near-line, cool, and off-line states, and may also indicate where the disk group is located and whether the disk group is in use. As part of state progression handling, the logic 102 may further implement functionality for handling disk group conflicts. For example, a disk group that is newly attached to a disk controller may have logical unit number (lun) assignments that conflict with a disk group that is in use on the disk controller. Accordingly, the logic 102 detects logical unit assignments at the time a disk group is again loaded from an inactive state, determines any conflicts, and resolves the conflicts, for example by modifying logical unit assignments of the disk group brought on line or by dismounting a data set to make room for the returning disk group.

The logic 102 may also determine whether a particular data set demands more RAM than is available, for example by calculating demand at load time. The logic 102 thus ensures sufficient space is available in RAM to virtually map all data described by the loading disk group. If insufficient space is available, the logic 102 may address the condition in a selected manner, for example by generating a message indicative of the condition and requesting user resolution, by automatically selecting a disk group to be replaced on the disk controller according to a predetermined criteria, or by other actions.

Some embodiments of the storage apparatus 100 may be adapted to perform one or more storage management tools. For example, the storage apparatus may further comprise a logic 122 adapted to execute storage management tool operations. In a typical implementation, the logic 122 operates in conjunction with a user interface 124 such as a graphical user interface although other types of interfaces may be used, for example front panel switches or buttons, keyboard interfaces, remote communication interfaces, and the like. The storage management tool operations operate upon metadata 104 stored on a disk group 106 including state information which self-describes state of the disk group 106 and enables a disk controller 108 to load and present virtual disks 110 corresponding to the disk group as logical units to a client 112 in the absence of disk group state information contained in the disk controller 108.

The logic 122 is depicted in the illustrative embodiment as resident in a storage management appliance merely for purposes as an example. The logic 122 may equivalently be positioned in any suitable device or system, for example the illustrative hosts or client, or in another device such as a server. Also for purpose of example, the logic 122 and graphical user interface 124 are shown resident in a different devices. The logic 122 and graphical user interface 124 may commonly be located in the same device.

The storage apparatus 100 may be configured as an Enterprise Virtual Array (EVA) made available by Hewlett-Packard Company of Houston, Tex. The Enterprise Virtual Array includes management software called Command View EVA that communicates and operates in coordination with the controllers 108 to control and monitor Enterprise Virtual Array storage systems. The Enterprise Virtual Array also includes Virtual Controller Software (VCS) that enables the Enterprise Virtual Array to communicate with Command View EVA via the controllers 108. VCS implements storage controller software capability that executes at least partly in the logic 102 and supports operations including dynamic capacity expansion, automatic load balancing, disk utilization enhancements, fault tolerance, and others. The Enterprise Virtual Array further includes physical hardware that constitutes the Enterprise Virtual Array including disk drives, drive enclosures, and controllers 108, which combine in a rack and are connected to a Storage Area Network (SAN). The Enterprise Virtual Array also includes host servers, computers that attach to storage pools of the Enterprise Virtual Array and use the virtual disks as any disk resource. The Enterprise Virtual Array is managed by accessing Command View EVA through a browser.

The storage apparatus 100 enables creation of storage management tool operations that further enable a storage administrator to optionally mount or dismount the self-describing disk groups 106. Virtual storage is only mapped in the limited amount of costly random access memory (RAM) when a user attempts to access the relevant storage. At other times, the idle storage disk group 106 can be maintained in a warm-standby near-line state, a cool state with disks spun down, or off-line with the relevant disk media removed and archived.

The storage apparatus 100 may further include a random access memory 120 that can be read and written by the logic 102. The logic 102 may be constructed to implement storage management tool operations that controllably mount and dismount the disk group 106. The logic 102 may also map the corresponding virtual disks 110 into the random access memory 120 when the virtual disks 110 are selectively accessed.

The logic 102 may be configured to define storage management tool operations which selectively set the state of the disk group. In an illustrative embodiment, disk group states include an active state, a near-line state, a spun-down state, and an off-line state.

The illustrative storage apparatus 100 enables creation of a spectrum of data set availability options ranging from online to near-line to off-line without adding further storage capacity such as tape library hardware and/or software. The illustrative storage apparatus 100, in combination with Low-cost Serial Advanced Technology Attachment (SATA) and Fibre Attached Technology Adapted (FATA) disk drives, enable acquisition of periodic snapshots of customer data to near-line or off-line groups, off-site archival, and migration of data to less expensive storage. The illustrative storage apparatus 100 also enables the advantages of tape backup without the management difficulty of special library hardware and software usage, and without burdening the mapping of active high-performance storage controller functionality.

In the near-line state, data from the disk drives can be accessed using automated techniques although one or more operational prerequisites are to be met before data may be accessed. In an illustrative example, the disk drives are operating in an idling state so that the disks are to be spun up to a rated rotation speed suitable for read and write operation.

The logic 102 configures a disk group for operation in the near-line state by installing disk group media in one or more media drives. The logic 102 writes metadata for accessing the disk group onto the disk group media resident on the physical drives for the disk group. In the near-line state, the one or more media drives for the disk group operate in an idling condition. The metadata resident on the disk group media drives is written with information sufficient to enable access of the disk group in absence of disk group state information contained in the disk controller.

In the near-line state, which may also be called a warm standby state, disk group metadata is stored on the disk drive rather than disk controller internal memory, so that costly memory is conserved. The disk groups in the near-line state do not use disk controller internal memory but are otherwise available for imminent access, mounted on idling disk drives and prepared for access when a data set in the disk group is requested. In response to the request, the logic 102 spins up the idling drive, reads the mapping metadata from the disk, and transfers the map to the disk controller internal memory. Thus, the disk controller RAM memory is allocated for multiple-use among an essentially unlimited number of disk groups, making an essentially unlimited amount of virtual space available. The near-line state enables imminent access of a virtually unlimited number of disk groups where all disk groups need not be instantiated or realized at the same time. The term "essentially unlimited" and "virtually unlimited" in the present context means that the amount of virtual space is bounded only by limits to hardware connections to disk drives. Fibre channel switches with capacity for loop and N-port service have no theoretical limits to bus addressability.

A storage management tool operation may be called to place a disk group in the near-line state. An example embodiment of the operation quiesces the selected disk group by terminating acceptance of new write commands directed to the disk group, transferring user data for the disk group from the disk controller write-back cache to disk, and flushing the disk controller write-back cache of user-dirty data. Execution of the quiescing action ensures that user data in the write-back cache is transferred to disk, the metadata is updated, and the cache is flushed of disk group metadata. The near-line storage management tool operation also may include various manipulations such as data leveling. The operation also enables any modification to metadata in the disk controller local memory to finish so that the metadata written to disk is in a final state. When finished, the disk group is in the near-line state and the disks are self-describing, coherent, and consistent. In the near-line state, disk group metadata can no longer be written and all of the mapping information is stored on disk. Accordingly, the near-line state storage management tool operation deletes all of the associated disk group maps in the local disk controller memory and frees the memory for usage by other disk groups, marks or tags the disk group as in the near-line state. The near-line state storage management tool operation also releases in software the allocation of random access memory that was previously reserved for the maps. The maps in memory are no longer needed since current mappings are written to disk. Once the disk group is in the near-line state, an error message is generated for attempts to access the disk group. The disk group in the near-line state can be accessed only after explicitly executing a storage management tool operation that restores the disk group back to the online state.

For online, near-line, and cool states, the disk group remains within the same slot of a disk enclosure. The cool state is similar to the near-line state, but is tagged as in the cool state with disk drives spun down and is identified as being contained in the slot. As in the near-line state, the disk group cannot be written in the cool state. The disk group is commonly placed in the cool state to declare the intention to maintain the disk group in the cool state indefinitely to save power but without intention to remove the disk group from the slot or cabinet. Because a disk group in the cool state constantly remains within the storage system, the disk group remains accessible simply by spinning up the disk and bringing the disk group on line so that any updates to the disk group and consistency of data are maintained.

Accordingly, a storage management tool operation places the disk group in the cool state using the same procedure as for the near-line transition except that the disk group is tagged as in the cool state.

In the off-line state the disks for the disk group are removed and archived. A storage management tool operation transitions the disk group from the online state to the off-line state using a procedure that duplicates the transition from online to near-line in combination with several additional actions. Dismounting and mounting the disk group inherently includes reading of metadata and setting and/or changing of state information. The off-line storage management tool operation also tags the disk group as in the off-line state and identifies the disk group with an identifier such as a Worldwide ID which can be accessed by host computers. The off-line storage management tool operation also modifies some of the disk group metadata to avoid inconsistent or incorrect interpretation of metadata content in conditions that a foreign disk group is mounted on a disk controller. A foreign disk group is one which has metadata and/or data written from a different disk controller.

Disk group metadata includes information describing data in the disk group. Disk group metadata also includes information describing the disk controller state, for example identification of the disk controller name, Worldwide ID of the disk group, error logs and management graphical user interface displays of the controller and disks attached to the controller. The disk group metadata describing disk controller state may also include information describing the controller and the rack and/or cabinet associated with the disk controller, information identifying an environmental monitor unit, if any, that may be connected to the disk controller.

A typical disk controller may support a specified number of disk groups. In one example, a disk controller may support up to sixteen disk groups. In a typical configuration, disk group metadata contains a description of data for that disk group alone and also contains a description of the entire controller, the rack containing the disk group, environmental monitor and all associated presentations to a host and to a management graphical user interface. Therefore, if any or all fifteen of the sixteen disk groups are destroyed, the remaining one is capable of describing data for the remaining group as well as the entire controller.

The off-line state creates the concept of foreign status for a disk group. A disk group brought off-line may be attached to a different controller or may be attached to the same controller which has been modified in a manner that creates the possibility of incorrect or conflicting performance. Accordingly, a disk group in the off-line state is foreign and thereby contains metadata with a correct description of disk group data but a description of the controller environment which is not relevant.

Thus, the storage management tool operation tags the disk group as off-line indicating an intention to allow the disk group to migrate. For example, a disk group that is made off-line from controller A declares the disk group as foreign, enabling migration. The disk group can be attached to controller B which accesses the metadata, reads the associated tag indicating the foreign nature of the disk group, and determines that the disk group is not the progeny of controller B. Controller B can operate on the disk group data and is not to be affected by the controller state information in the metadata. In an illustrative embodiment, disk group metadata is tagged with the Worldwide ID, enabling the controller to determine whether the disk group is foreign to the controller. In the case that the disk group is returned to controller A, controller A can read the Worldwide ID tag and determine that the disk group is not foreign and also read the tag indicating off-line state, enabling determination that the controller state information in the metadata may not be current and may not be trusted as an authoritative copy of the controller metadata.

In some applications, tag information such as the Worldwide ID may be used to identify source or parentage of data. For example a business entity may migrate data from a first business unit to a second business unit by moving data off-line and tagging metadata with source information. For instance a disk group accumulated from a human resources department may be migrated to a legal department whereby the tags enable the legal department to determine the data source as well as authenticity.

The capability to migrate data enables physical disks to be moved from one array to another in the same, or different, physical facilities. Similarly, with a consistent set of signatures across firmware and/or product versions, the migration capability may be used to enable updating of storage arrays without necessitating downtime to copy the data from an old array to a new array. The migration capability may also be implemented to accommodate major changes in hardware in a storage system with metadata added to address modifications while enabling upward metadata compatibility and continued support of legacy metadata.

Metadata compatibility may be tracked on the basis of a compatibility index whereby data can always be read from a disk group with a compatibility index that is the same as or at most one lower than the current index. A data set can always be updated that was formed on a previous generation of devices so that data moves through a progression of controllers. At each progression event, the compatibility index can be increased to the current state so the data does not become too stale. Archival storage need not be mapped for each increment of the compatibility index but rather is incremented only for installation of substantial new features that cause metadata modifications to exceed a selected bit count.

Figure 2:
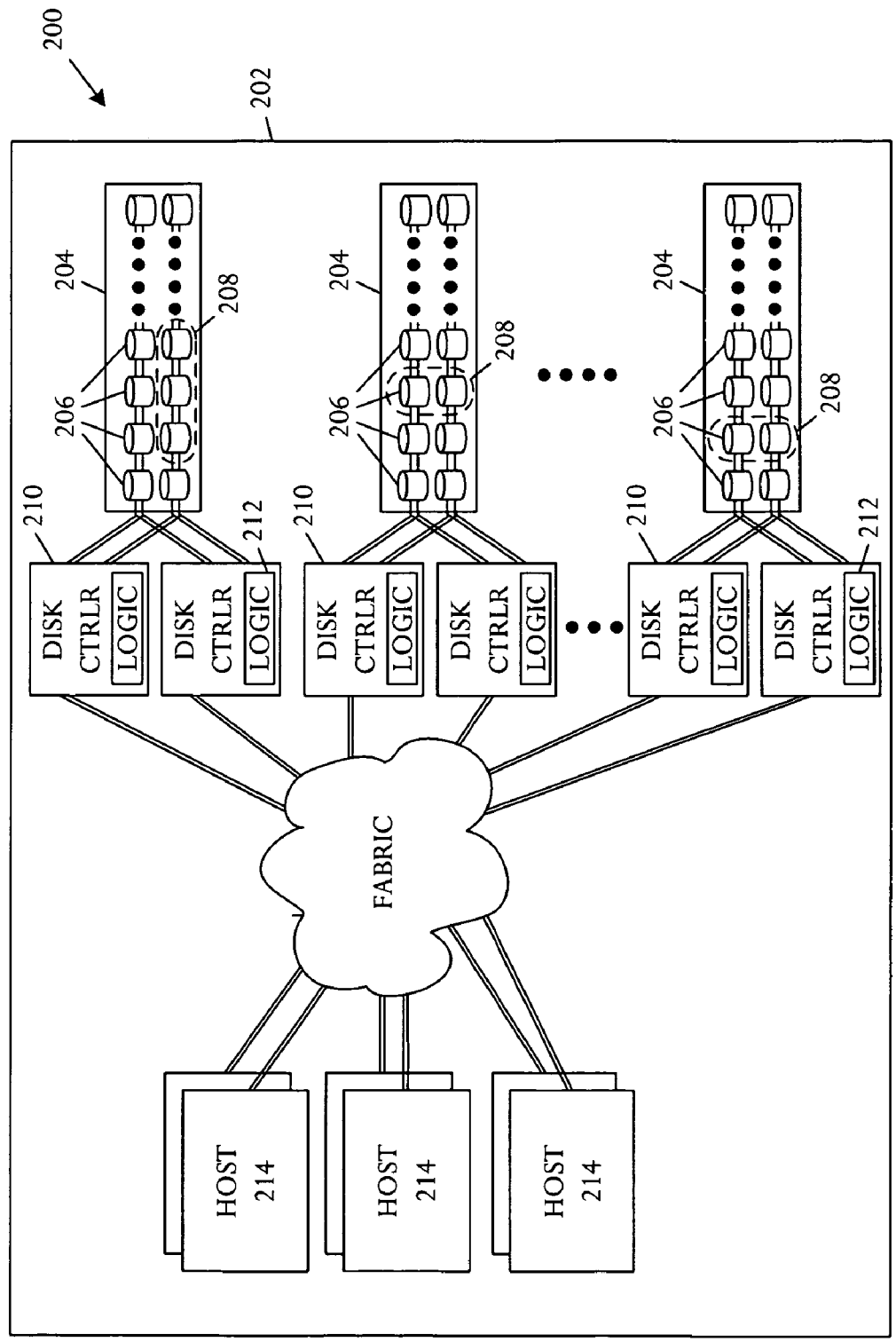
FIG. 2 is a schematic block diagram illustrating an embodiment of a storage system including disk enclosures collected in large cabinets that exceed addressability limitations imposed in network standards.

The illustrative structures and techniques may be implemented in combination with extendable network fabric such as Fibre Channel switches adapted for loop or expandable port (N-port) service so that disk enclosures may be collected in large cabinets that exceed addressability limitations imposed in network standards. Referring to FIG. 2, a schematic block diagram depicts an embodiment of a storage apparatus 200 further comprising a storage system 202. The storage system 202 comprises one or more storage cabinets 204 containing a plurality of disk drives 206 arranged in the storage cabinets 204 and divided into disk group subsets 208. The storage system 202 further comprises one or more virtualizing disk controllers 210 communicatively coupled to the disk drives 206. The storage system 202 further comprises a logic 212 adapted to map an arrangement of virtualizing disk controllers 210 to disk group subsets 208. The logic 212 may be executable in one or more of the virtualizing disk controllers 210 and operates to serve logical units of a selected one or more of the disk groups 208 to a host 214 or host cluster.

In some implementations, the logic 212 is responsive to a change in disk controller configuration by dynamically reconfiguring the mapping of virtualizing disk controllers 210 to disk group subsets 208.

Figure 3:
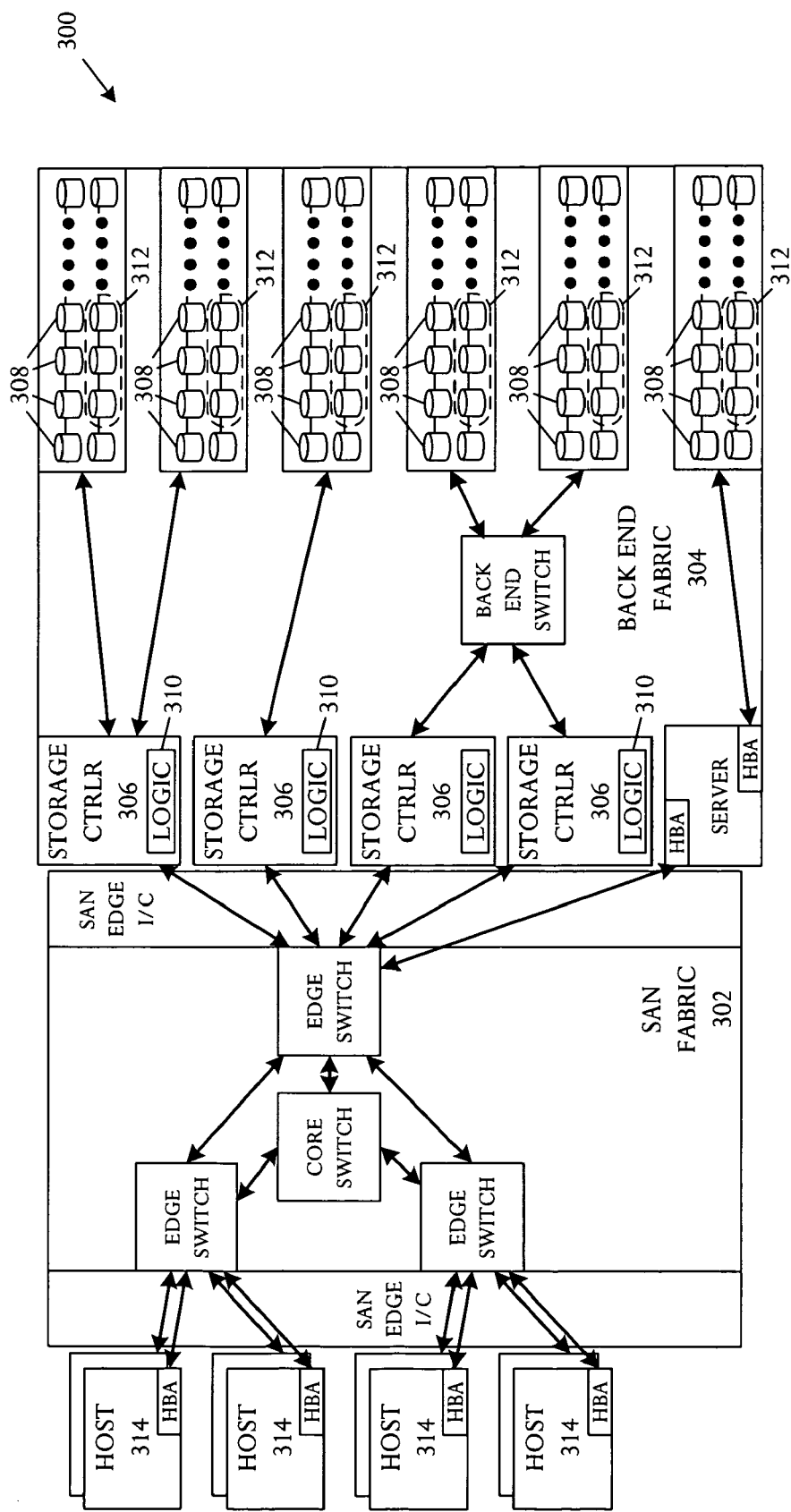
FIG. 3 is a schematic block diagram showing an embodiment of a storage apparatus with multiple mutually-decoupled storage controllers connected in a grid into a network fabric to share a potentially unlimited amount of storage.

The illustrative structures and techniques may be applied to construct a grid of multiple virtualizing storage controllers on a storage area network (SAN) to enable access to a very large number of disk drives, for example thousands of disk drives. The multitude of disk drives can be arranged and accessed according to application or purpose. Referring to FIG. 3, a schematic block diagram illustrates an embodiment of a storage apparatus 300 with multiple mutually-decoupled storage controllers 306 which are connected in a grid into a network fabric 302 to share a potentially unlimited amount of storage. The arrangement avoids the failure mode caused by failure of one or more controllers by enabling many other controllers configured to access the same disk groups as the failed controller to map the disk groups and take the disk groups from an off-line state to an online state. A substituted controller can thus fairly rapidly present the storage represented by the disk groups to the same host or hosts that the failed controller was serving.

The storage apparatus 300 comprises a storage area network 302 with a grid of multiple virtualizing storage controllers 306 on a Storage Area Network (SAN) connected by a back-end fabric 304 to thousands of disk drives 308. The storage area network comprises a network fabric 302 connecting multiple virtualizing storage controllers 306 and a multiplicity of disk drives 308. The storage apparatus 300 may further comprise a logic 310 executable on one or more of the multiple virtualizing storage controllers 306 that divides the disk drives 308 into one or more disk groups 312 which are cooperatively organized for a common purpose. The logic 310 may create logical units from a selected storage controller to a selected application set in one or more client hosts 314 coupled to the storage area network by the network fabric 302.

The storage apparatus 300 enables construction of a grid of data storage resources served by a collection of virtualizing disk controllers. The disk controllers have shared serial access to a much larger collection of disk drives than can be served by any one controller over conventional Fibre Channel-Arbitrated Loop (FCAL) bus technology. Controllers on the grid, in aggregate, serve storage at an elevated bandwidth which is enabled by the multiple simultaneous connections of the fibre channel switch fabric. The controllers may also operate as stand-bys for one another, increasing data availability.

In one illustrative arrangement, the storage area network 302 forms a grid that may have one or more resident disk groups that do not migrate and always contain the controller's metadata. Multiple nonresident disk groups may be allocated that freely migrate and contain data but may have controller metadata omitted and are thus unencumbered with redundant controller information.

The storage controllers 306 operate as targets for storage requests through the storage area network 302 from the client hosts 314. The hosts 314 have a host bus adapter (HBA) which interfaces via a storage area network interconnect to switches in the storage area network fabric. The storage controllers 306 pass requests as an initiator to a back end link in the storage array. The storage area network 302 is typically composed of SAN edge links, switches, and inter-switch links that interconnect devices such as servers, controllers, tapes, storage area network appliances, and the like.

Figure 4:
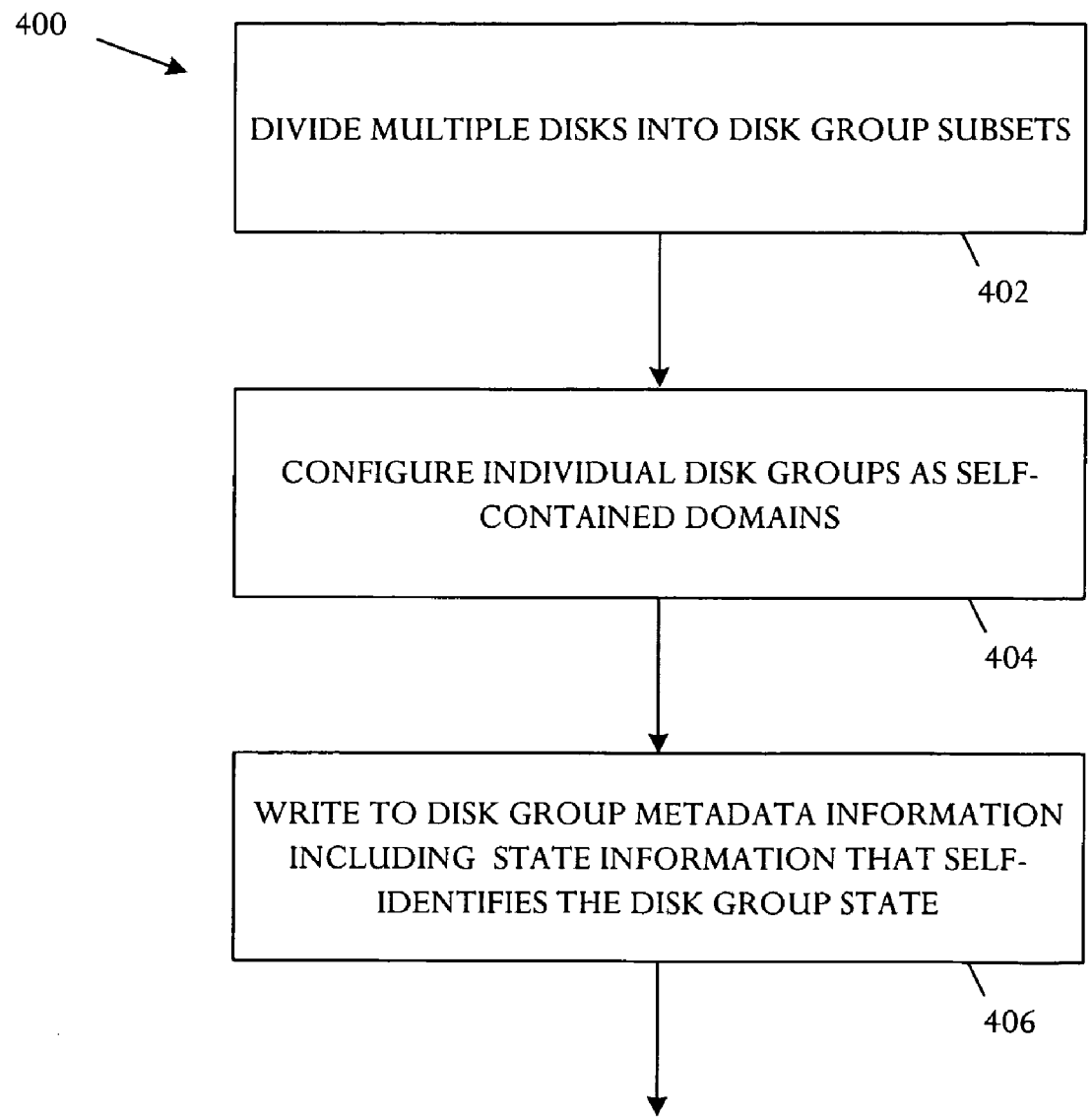
FIG. 4 is a flow chart showing an embodiment of a method for creating and/or accessing virtually unlimited storage.

Referring to FIG. 4, a flow chart shows an embodiment of a method 400 for creating and/or accessing virtually unlimited storage. The method 400 may be executed in any suitable storage system logic 102, 212 and 310. In a particular example, the method 400 may be implemented in a stand-alone disk controller serving a Storage Area Network (SAN) from a collection of back-end disks such as systems 100, 200, and 300. One or more intelligent Redundant Array of Independent Disk (RAID) data-mover modules may be used to facilitate data transfer.

The logic divides 402 a plurality of disks into disk group subsets. The logic configures 404 an individual disk group as a self-contained domain. Virtualized disks are allocated from the disk group self-contained domain. The logic writes 406 to the disk group metadata various information including state information that self-identifies the disk group state. The information also enables a disk controller to load and present virtual disks corresponding to the disk group as logical units to a client in the absence of disk group state information contained in the disk controller.

Figure 5:
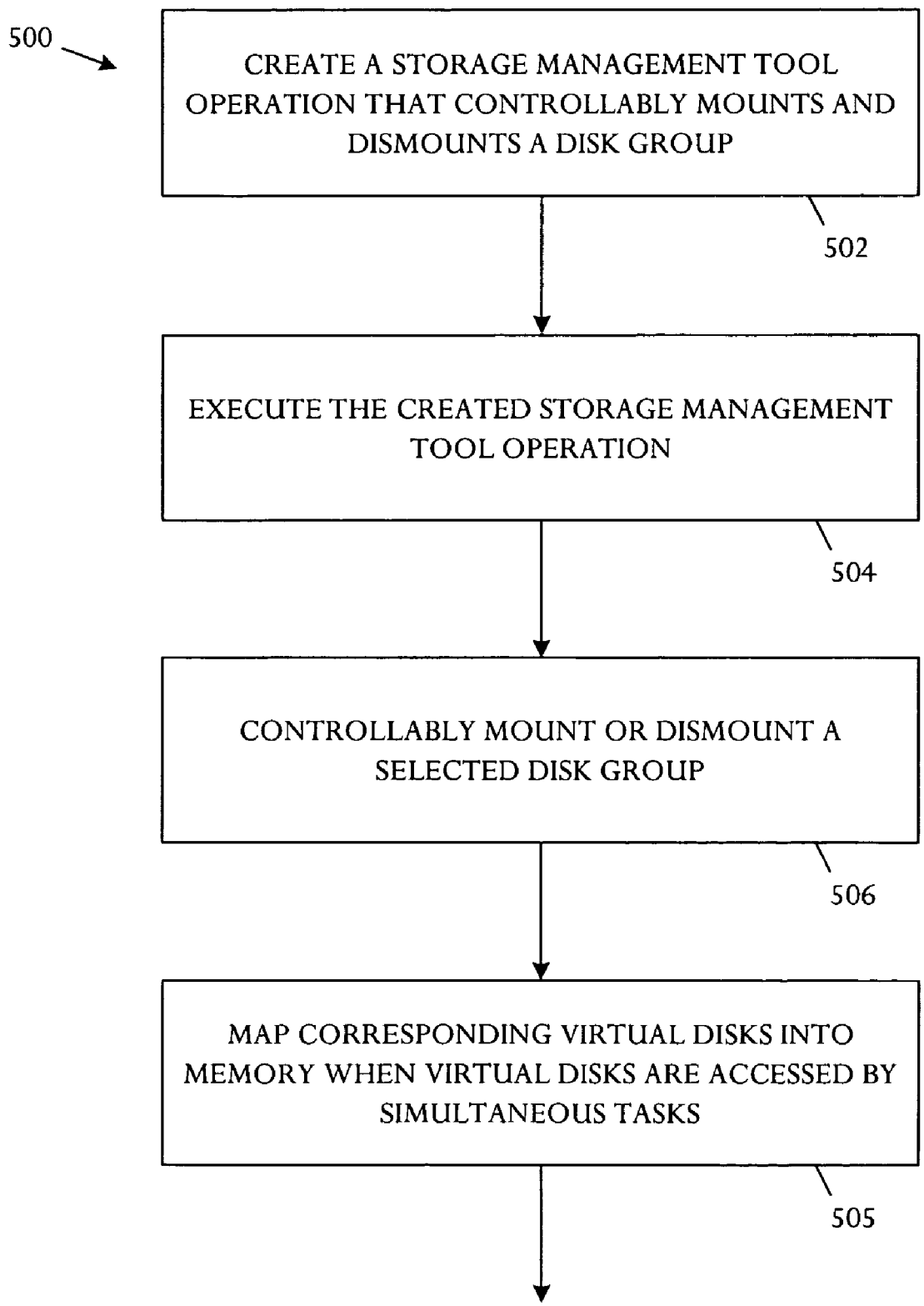
FIG. 5 is a flow chart illustrating an embodiment of a method for managing self-describing disk groups in a system with virtually unlimited storage.

Referring to FIG. 5, a flow chart illustrates an embodiment of a method 500 for managing self-describing disk groups in a system with virtually unlimited storage. Logic creates 502 a storage management tool operation that controllably mounts and dismounts the disk group. Logic can execute 504 the created storage management tool operation by controllably mounting or dismounting 506 a selected disk group and mapping 508 the corresponding virtual disks into the random access memory when the virtual disks are accessed by various simultaneously executing processes or tasks.

The storage management tool operations can perform various operations and applications. In a particular example, the storage management tools enable the logic to set 510 the state of a disk group from among multiple states. For example, the logic may select 510 the disk group state from among an active state, a near-line state, a spun-down state, and an off-line state.

Figure 6:
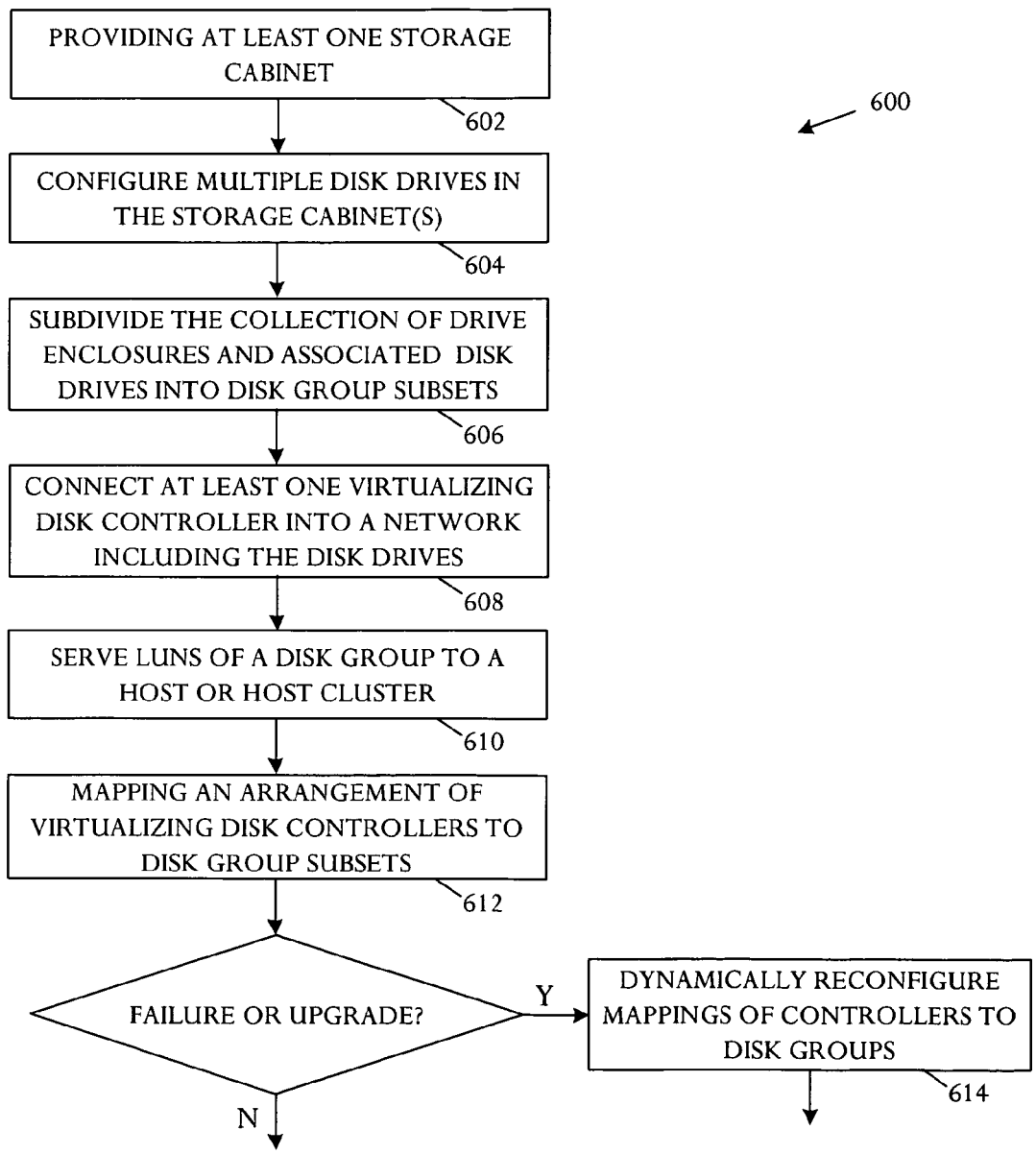
FIG. 6 is a schematic flow chart depicting an embodiment of another aspect of a method adapted for supporting a virtually unlimited storage capacity.

Referring to FIG. 6, a schematic flow chart depicts an embodiment of another aspect of a method 600 adapted for supporting a virtually unlimited storage capacity. With the advent of relatively inexpensive fibre channel switches that support loop or N-port service, disk enclosures can be collected in large cabinets that exceed the common addressability of the fibre channel-arbitrated loop (FC-AL) bus. The method 600 comprises providing 602 one or more storage cabinets and arranging 604 multiple disk drives in the storage cabinet or cabinets. The large collection of drive enclosures and associated drives are subdivided 606 into disk group subsets. The disk groups can contain related file sets or databases that comprise the storage space applied to one or more applications on a particular client host. One or more virtualizing disk controllers can be connected 608 into a network that includes the multiple disk drives. For example, multiple virtualizing disk controllers can be attached to the large collection of disks and an individual disk controller can at any moment serve 610 logical units (luns) of one of the disk groups to a host or cluster of hosts. The method 600 further comprises mapping 612 an arrangement of virtualizing disk controllers to disk group subsets. When a disk controller fails or a new disk controller is added to the system, the mappings of disk controllers to disk groups can be dynamically reconfigured 614 to continue service in the event of failure or to improve balancing of service.

In a particular technique, client data may be migrated by dividing multiple disks into disk group subsets and configuring an individual disk group as a self-contained domain from which virtualized disks are allocated and presented as logical units to the client. To the disk group metadata is information including mapping information and state information that self-identifies state of the disk group. The disk group may be dismounted from a first array, physically moved from the first array to a second array, and then mounted to the second array. The mounting action includes reading the disk group metadata, enabling a disk controller to load and present the virtualized disks corresponding to the disk group as logical units to a client. The disk group becomes accessible from the second array.

Figure 7:
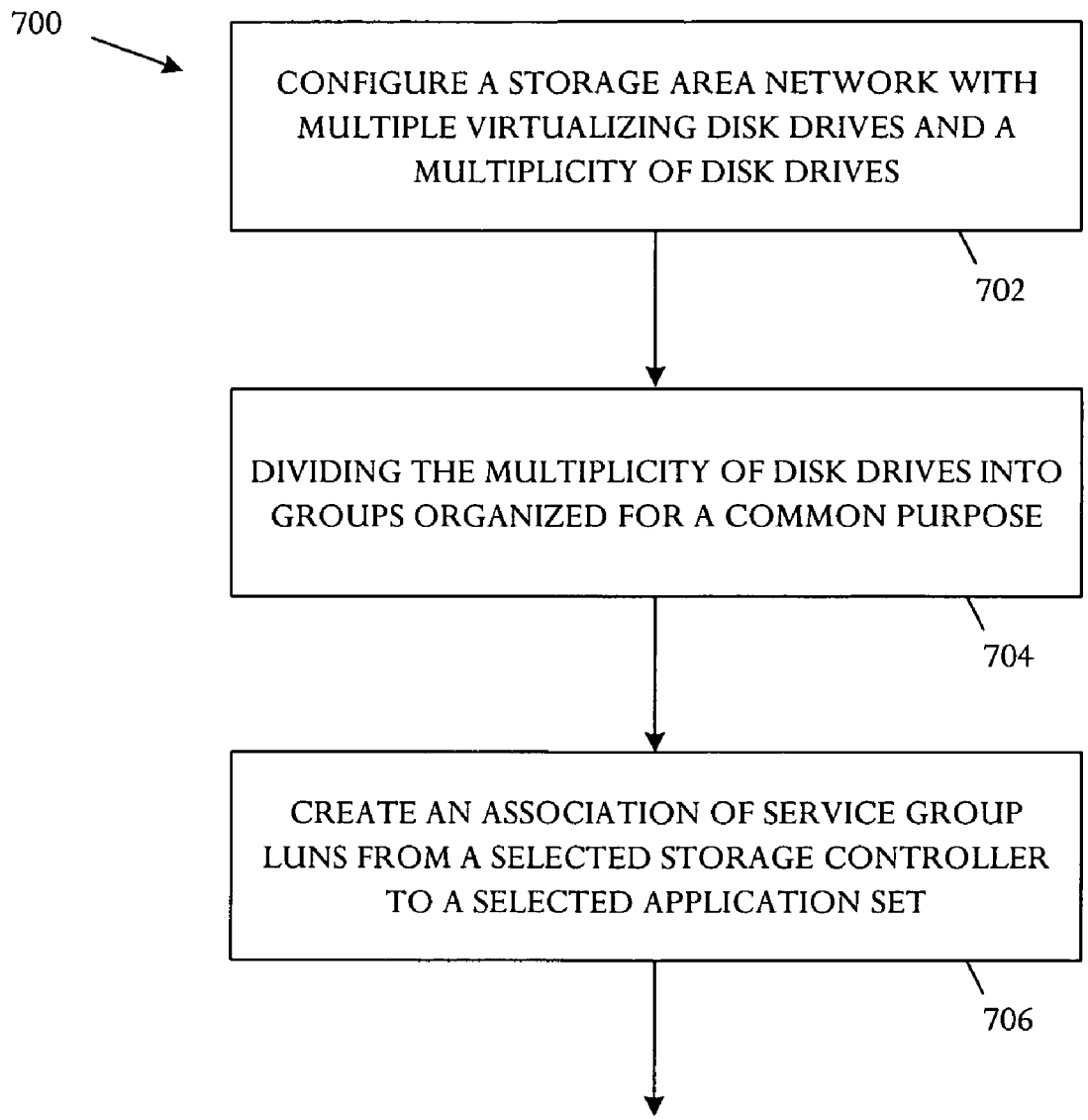
FIG. 7 is a schematic flow chart illustrating an embodiment of a method for applying virtually unlimited storage to construct a grid of multiple virtualizing storage controllers.

Referring to FIG. 7, a schematic flow chart depicts an embodiment of a method 700 for applying virtually unlimited storage to construct a grid of multiple virtualizing storage controllers. The method 700 comprises configuring 702 a storage area network with multiple virtualizing storage controllers and a multiplicity of disk drives. For example, a grid may be constructed with multiple virtualizing storage controllers on a storage area network (SAN) connected via a back-end fabric to thousands of disk drives. The multitude of disk drives can be divided 704 into one or more disk groups cooperatively organized for a common purpose. The method 700 further comprises creating 706 an association of a service group of logical units (luns) from a selected individual storage controller to a selected application set in one or more client hosts coupled to the storage area network. The service of luns associating storage controllers to different application sets may be created for some or all of the storage controllers. Management tool operations may be created to enable application sets to fail over to another functioning controller in the event of a controller failure.

In some embodiments, storage may be managed by connecting a number of virtual disks to a disk controller loop of a disk controller and mounting a portion of the number of virtual disks to the disk controller wherein a storage map is loaded into a fixed-size memory of the disk controller for each virtual disk mounted. A request for data contained on an unmounted virtual disk may be received with the unmounted virtual disk having a storage map of certain size. A sufficient number of mounted virtual disks may be dismounted to allow the fixed-size memory to accommodate the certain size of the unmounted virtual disk storage map. The unmounted virtual disk may be mounted.

In some implementations, mounting the unmounted virtual disk may further comprise reading disk group metadata from the unmounted virtual disk, thereby enabling a disk controller to load and present the virtualized disks corresponding to the disk group as logical units to a client.

Some configurations may implement a system wherein mounting the unmounted virtual disk may comprise actions of reading disk group metadata from the unmounted virtual disk and updating state information in the disk group metadata in compliance with conditions of mounting.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, the disclosed storage controllers, storage devices, and fabrics may have any suitable configuration and may include any suitable number of components and devices. The illustrative structures and techniques may be used in systems of any size. The definition, number, and terminology for the disk group states may vary depending on application, custom, and other considerations while remaining in the claim scope. The flow charts illustrate data handling examples and may be further extended to other read and write functions, or may be modified in performance of similar actions, functions, or operations.

What is claimed is:

1. A method of migrating client data comprising:
    dividing a plurality of disks into disk group subsets;
    configuring an individual disk group as a self-contained domain from which virtualized disks are allocated and presented as logical units to the client;
    writing to the disk group metadata information including mapping information and state information that self-identifies state of the disk group;
    dismounting the disk group from a first array;
    physically moving the disk group from the first array to a second array;
    mounting the disk group to the second array including reading the disk group metadata, enabling a disk controller to load and present the virtualized disks corresponding to the disk group as logical units to a client; and
    accessing the disk group from the second array.

2. The method according to claim 1 further comprising:
    writing metadata information to the disk group comprising:
        writing state information in mirrored protected areas of the disks so that the disk controller loads and presents virtualized disks as logical units (luns) without the disk controller containing any state data for the disk group whereby the disk group metadata creates the self-describing functionality of the disk group.

3. The method according to claim 2 further comprising:
    writing the state information including tags describing state progression of the disk group among on-line, near-line, and off-line states.

4. The method according to claim 1 further comprising:
    writing sufficient metadata within a disk group to enable complete reconstruction of the disk group with no additional information whereby the disk group is reconstructed in a different system with a different controller at an indeterminate time in the future.

5. The method according to claim 1 further comprising:
    selectively tagging individual disks of the disk plurality for optionally installation into any of multiple slots in at least one storage arrays whereby tags describe disk properties sufficiently to reconstruct disk group mapping regardless of disk installation position and regardless of the storage system to which the disks are returned from archive, migration, or transport.

6. The method according to claim 1 further comprising:
    virtualizing disks comprising:
        writing bootstrap information that originates map loading at a beginning location of a disk, the bootstrap information describing position of remaining data enabling recreation of an entire data set and all metadata; and
        writing sufficient data to the disk to enable the disk to be taken off-line, transported, migrated, and archived, and then returned to the originating slot or to any slot in any system whereby the maps are recreated upon disk reinstallation.

7. The method according to claim 1 further comprising:
    virtualizing a subset of storage; and
    conserving local memory by loading only a portion of virtualization maps at one time whereby only information that is currently active is mapped including currently accessed data and current data snapshots, and dormant data that is not currently accessed is not mapped.

8. The method according to claim 1 further comprising:
    taking a selected disk group off-line;
    removing metadata of the selected disk group from memory;
    flushing the removed metadata onto storage in the selected disk group;
    moving a replacing disk group on-line to replaced the selected disk group;
    writing metadata of the replacing disk group to memory whereby the removed metadata is replaced; and
    controlling spin-down of the selected disk in coordination with metadata manipulation whereby a cached copy of selected disk group metadata is stored in memory during usage and flushed onto storage in the selected disk group before the disk is spun down or dismounted.

9. The method according to claim 1 further comprising:
    managing state progression tags in the metadata including progression tags that indicate disk group state, location, logical unit assignment, and activity;
    detecting logical unit assignments at a time a disk group is reloaded from an inactive state;
    determining conflicts; and
    resolving the conflicts by modifying logical unit assignments of the reloaded disk group or by dismounting a data set to make room for the reloaded disk group.

10. The method according to claim 1 further comprising:
    transitioning a selected disk group from an on-line state to an off-line state for removal and archiving comprising:
        writing metadata for accessing the selected disk group onto disk group media resident on the physical drives for the selected disk group, the accessing metadata including information sufficient to enable access of the selected disk group in absence of disk group state information contained in a disk controller;
        reading metadata and setting and changing state information inherent to selected disk group dismounting and mounting;

tagging the selected disk group as off-line;
identifying the selected disk group with an identifier that is accessed by host computers; and
modifying the selected disk group metadata to avoid inconsistent and incorrect metadata content interpretation in conditions that a foreign disk group is mounted on a disk controller whereby a foreign disk group has metadata or data written from a different disk controller.

11. The method according to claim 1 further comprising:
connecting a plurality of virtualized disks to a disk controller loop of the disk controller;
mounting a portion of the virtualized disk plurality to the disk controller wherein a storage map is loaded into a fixed-size memory of the disk controller for each mounted virtualized disk;
receiving a request for data contained on an unmounted virtualized disk having a storage map of predetermined size;
dismounting a sufficient number of mounted virtualized disks to enable the fixed-size memory to accommodate the predetermined size of the unmounted virtual disk storage map; and
mounting the unmounted virtualized disk.

12. The method according to claim 11 whereby mounting the unmounted virtualized disk further comprises:
reading disk group metadata from the unmounted virtualized disk whereby the disk controller is enabled to load and present the virtualized disks corresponding to the disk group as logical units to a client.

13. The method according to claim 11 whereby mounting the unmounted virtual disk further comprises:
reading disk group metadata from the unmounted virtualized disk; and
updating state information in the disk group metadata in compliance with mounting conditions.

14. An article of manufacture comprising:
a tangible controller-usable storage medium having a computer readable program code embodied therein for managing data services, the computer readable program code further comprising:
a code causing the controller to divide a plurality of disks into disk group subsets;
a code causing the controller to configure an individual disk group as a self-contained domain from which virtualized disks are allocated and presented as logical units to the client;
a code causing the controller to write to the disk group metadata information including mapping information and state information that self-identifies state of the disk group;
a code causing the controller to dismount the disk group from an array;
a code causing the controller to detect presence of a foreign disk group that is created on a foreign controller distinct from the controller;
a code causing the controller to mount the foreign disk group to the array including reading foreign disk group metadata, enabling the disk controller to load and present the virtualized disks corresponding to the foreign disk group as logical units to a client; and
a code causing the controller to access the foreign disk group from the array.

15. The article on manufacture according to claim 14 further comprising:
a code causing the controller to write sufficient metadata within a disk group to enable complete reconstruction of the disk group with no additional information whereby the disk group is reconstructed in a different system with a different controller at an indeterminate time in the future.

16. The article of manufacture according to claim 14 further comprising:
a code causing the controller to virtualize disks comprising:
a code causing the controller to write bootstrap information that originates map loading at a beginning location of a disk, the bootstrap information describing position of remaining data enabling recreation of an entire data set and all metadata; and
a code causing the controller to write sufficient data to the disk to enable the disk to be taken off-line, transported, migrated, and archived, and then returned to the originating slot or to any slot in any system whereby the maps are recreated upon disk reinstallation.

17. The article of manufacture according to claim 14 further comprising:
a code causing the controller to manage state progression tags in the metadata including progression tags that indicate disk group state, location, logical unit assignment, and activity;
a code causing the controller to detect logical unit assignments at a time a disk group is reloaded from an inactive state;
a code causing the controller to determine conflicts; and
a code causing the controller to resolve the conflicts by modifying logical unit assignments of the reloaded disk group or by dismounting a data set to make room for the reloaded disk group.

18. The article of manufacture according to claim 14 further comprising:
a code causing the controller to transition a selected disk group from an on-line state to an off-line state for removal and archiving comprising:
a code causing the controller to write metadata for accessing the selected disk group onto disk group media resident on the physical drives for the selected disk group, the accessing metadata including information sufficient to enable access of the selected disk group in absence of disk group state information contained in a disk controller;
a code causing the controller to read metadata and setting and changing state information inherent to selected disk group dismounting and mounting;
a code causing the controller to tag the selected disk group as off-line;
a code causing the controller to identify the selected disk group with an identifier that is accessed by host computers; and
a code causing the controller to modify the selected disk group metadata to avoid inconsistent and incorrect metadata content interpretation in conditions that a foreign disk group is mounted on a disk controller whereby a foreign disk group has metadata or data written from a different disk controller.

19. The article of manufacture according to claim 14 further comprising:
a code causing the controller to connect a plurality of virtualized disks to a disk controller loop of the disk controller;
a code causing the controller to mount a portion of the virtualized disk plurality to the disk controller wherein a storage map is loaded into a fixed-size memory of the disk controller for each mounted virtualized disk;

a code causing the controller to receive a request for data contained on an unmounted virtualized disk having a storage map of predetermined size;
a code causing the controller to dismount a sufficient number of mounted virtualized disks to enable the fixed-size memory to accommodate the predetermined size of the unmounted virtual disk storage map; and
a code causing the controller to mount the unmounted virtualized disk.

20. The article of manufacture according to claim 19 further comprising:
a code causing the controller to read disk group metadata from the unmounted virtualized disk whereby the disk controller is enabled to load and present the virtualized disks corresponding to the disk group as logical units to a client.

* * * * *